(12) United States Patent
Lucey

(10) Patent No.: US 6,411,709 B1
(45) Date of Patent: Jun. 25, 2002

(54) FLEXIBLE MICROPHONE BOOM

(75) Inventor: Robert E. Lucey, Sudbury, MA (US)

(73) Assignee: Unex Corporation, Nashua, NH (US)

( * ) Notice: Subject to any disclaimer, the term of this patent is extended or adjusted under 35 U.S.C. 154(b) by 0 days.

(21) Appl. No.: 08/341,500

(22) Filed: Nov. 17, 1994

(51) Int. Cl.$^7$ .......................... H04M 1/00; H04R 25/00
(52) U.S. Cl. ........................ 379/430; 381/183; 381/187
(58) Field of Search ................................ 379/430, 433; 381/183, 187, 168, 169, 188, 189; 174/102 R, 105 R, 113 R

(56) References Cited

U.S. PATENT DOCUMENTS

| | | | |
|---|---|---|---|
| 3,562,451 A | 2/1971 | Mullen, Jr. et al. | 179/187 |
| 3,621,156 A | 11/1971 | Kllewer | 179/150 |
| 3,781,492 A | 12/1973 | Cragg et al. | 179/156 A |
| 3,796,841 A | 3/1974 | Gorman | 179/156 A |
| 3,971,900 A | 7/1976 | Foley | 179/156 A |
| 4,020,297 A | 4/1977 | Brodie | 179/156 A |
| 4,039,765 A | 8/1977 | Tichy et al. | 179/156 A |
| 4,251,686 A | 2/1981 | Sokolich | 179/1 N |
| 4,259,544 A * | 3/1981 | Litauer | 174/102 R |
| 4,296,829 A | 10/1981 | Pedersen | 181/129 |
| 4,335,281 A | 6/1982 | Scott et al. | 179/156 A |
| 4,564,955 A | 1/1986 | Birch et al. | 381/69 |
| 4,588,868 A | 5/1986 | Bertagna et al. | 179/156 R |
| 4,617,431 A | 10/1986 | Scott et al. | 179/156 A |
| 4,677,675 A | 6/1987 | Killion et al. | 381/68.2 |
| 4,720,857 A | 1/1988 | Burris et al. | 379/430 |
| 4,771,454 A | 9/1988 | Wilcox, Jr. | 379/430 |
| 4,893,344 A | 1/1990 | Tragardh et al. | 381/187 |
| 4,917,504 A | 4/1990 | Scott et al. | 381/187 |
| 4,932,052 A | 6/1990 | Lo | 379/430 |
| 4,972,491 A | 11/1990 | Wilcox, Jr. | 381/187 |
| 5,191,602 A | 3/1993 | Regen et al. | 379/58 |
| 5,210,791 A | 5/1993 | Krasik | 379/377 |
| 5,260,997 A | 11/1993 | Gattey et al. | 379/430 |
| 5,369,857 A * | 12/1994 | Sacherman et al. | 379/430 |
| 5,414,769 A * | 5/1995 | Gattey et al. | 379/430 |

\* cited by examiner

*Primary Examiner*—Jeffery Hofsass
*Assistant Examiner*—Jack Chiang
(74) *Attorney, Agent, or Firm*—Weingarten, Schurgin, Gagnebin & Lebovici LLP

(57) ABSTRACT

A flexible microphone boom includes an inner conductor provided from a plurality of wire strands. Disposed about the inner conductor is Fin inner insulator having a first predetermined thickness. Disposed about the inner insulator is a conductive layer and disposed about the conductive layer is a an outer jacket having a second predetermined thickness.

15 Claims, 3 Drawing Sheets

FLEXIBLE MICROPHONE BOOM

BACKGROUND OF THE INVENTION

This invention relates to head-set assemblies and more particularly to microphone booms used in head-set assemblies.

As is known in the art a head-set assembly generally includes a microphone assembly disposed at the first end of a microphone boom such that the microphone may be disposed near a user's mouth. A second end of the boom is connected to either a so-called hanger or to a receiver which is adapted to rest on a portion of the user's head such as an ear for example. Thus, the boom physically connects and the microphone to the receiver.

One type of microphone boom is generally provided from a hollow tube having a body made of metal or other suitably stiff material. One or more wires from the microphone may then be disposed through the hollow center of the tube to electrically connect the microphone to a transmit path amplifier. Such microphone booms however, are generally stiff, cumbersome, and relatively heavy when worn on a user's head for a long period of time.

Moreover, it is relatively difficult to adjust and maintain the position of the microphone when the headset is worn by different users. To solve these problems, the microphone can be coupled to a flexible microphone boom. Such flexible booms are constructed by disposing a single strand support wire and two insulated wires into the center of a hollow outer sleeve made of lightweight material or provided as a so-called gooseneck design. The two insulated wires are coupled at one end to the microphone and at the opposite end to the transmit path amplifier. One problem with this approach, however, is that the single strand support wire tends to fracture or completely break due to work hardening caused by repeated flexing of the boom over time.

It would be desirable therefore to provide a flexible cable boom which is lightweight and comfortable for a user to wear for long periods of time and which allows placement of the microphone near the user's mouth and which is rugged enough to avoid fracturing or breaking even after being bent repeatedly over long periods of time.

SUMMARY OF THE INVENTION

In accordance with the present invention a microphone boom includes an inner conductor having a plurality of support strands, a first insulator disposed about the inner conductor, an outer conductor disposed about the first insulator to shield the inner conductor and an outer jacket disposed about said outer conductor. With this particular arrangement a flexible microphone boom positionable to fit a plurality of different users is provided. The inner conductor is provided from a plurality of separate strands of conductive wire. By providing a support wire from a plurality of different strands of wire, the flexible cable boom may be repeatedly flexed and will not fracture. Thus, the flexible cable boom is reliable. The strands are disposed such that a first one of the strands is centrally disposed and the remaining strands are arranged about the central strand in a substantially circular pattern. The outer strands are wound about the inner strand in a spiral pattern such that the strands are maintained in a predetermined position. A microphone is coupled to a first one of the strands of the inner conductor at a first end of the boom. A second end of the boom is coupled to the housing of an ear mounted receiver or alternatively to a hanger in a so-called over-the-head headset to thus provide a head-set assembly having a flexible microphone boom.

Since the microphone boom is flexible, the microphone can be positioned proximate the user's mouth to provide good sound and more comfort to the user. Moreover the plurality of strands of wire which provide the flexible boom of the present invention are selected having relatively small diameters and resulting in lightweight flexible microphone boom. Thus the microphone boom of the present invention aids in providing a headset which is more easily balanced on a user's head. Moreover the manner in which the strands are disposed allows the microphone position to be maintained after adjustment.

BRIEF DESCRIPTION OF THE DRAWINGS

The foregoing features of this invention as well as the invention itself may be more fully understood from the following Detailed Description of the Drawings in which.

DESCRIPTION OF THE PREFERRED EMBODIMENTS

Figure 1:
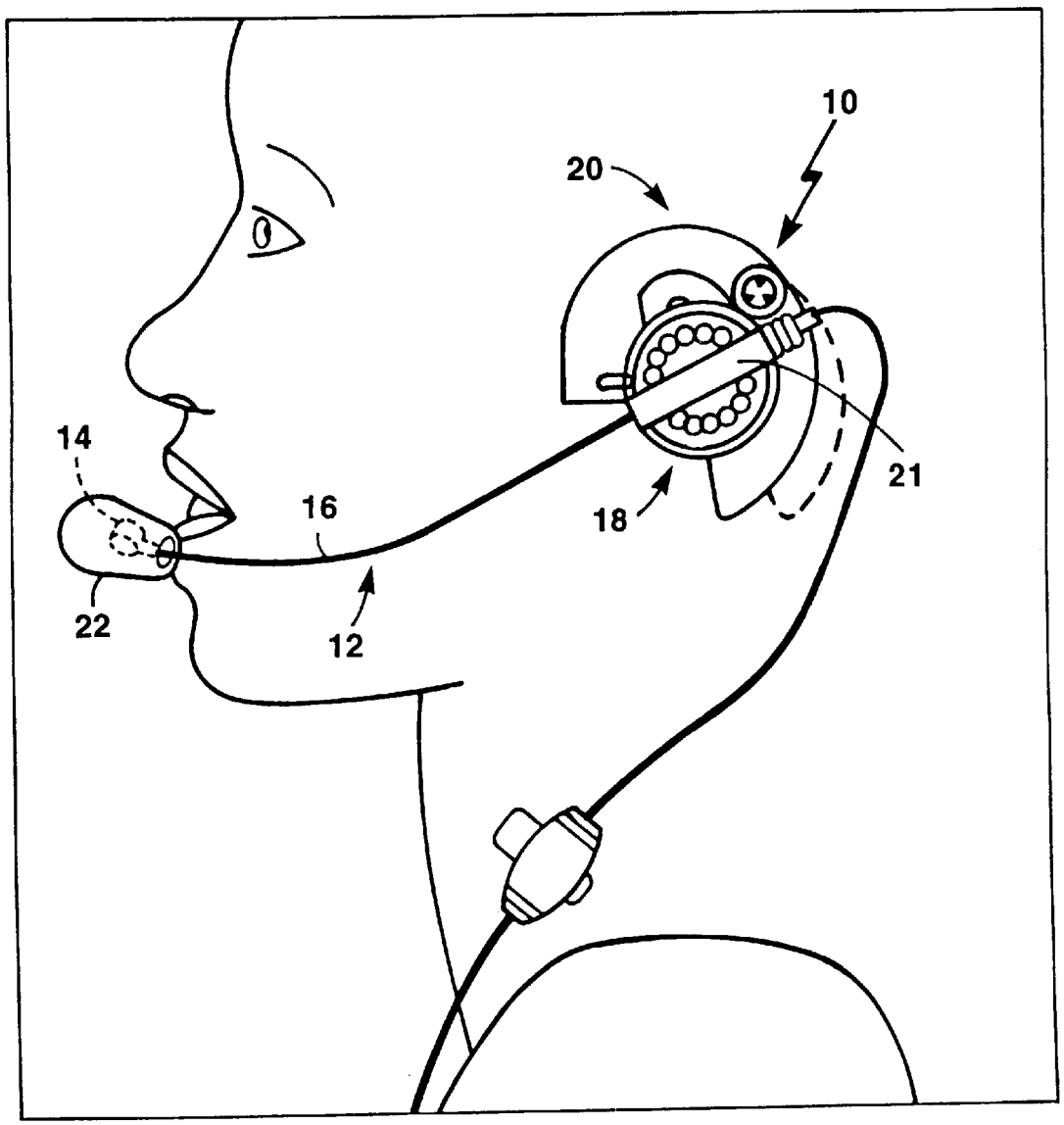
FIG. 1 is a side view of a head-set assembly disposed on a user.

Referring now to FIG. 1 a head-set assembly 10 is shown to include a flexible boom 12 having a first end coupled to a microphone assembly 14 and a second end coupled to a receiver 18. The flexible microphone boom 12 provides an electrical connection between the microphone assembly 14 and the receiver 18. Means 20 for attaching the head-set 10 to an ear of a user is shown disposed about the receiver 18 and attached to the second end of the boom 12.

In this particular embodiment the second end of the flexible cable boom 12 is coupled to a housing of the receiver 18. The second end of the cable boom is coupled to a connector which is adapted to connect to a headset amplifier 12. Those of ordinary skill in the art will appreciate of course that in a so-called over-the-head type headset assembly the flexible cable boom will be coupled to a boom turret of a hanger. Alternatively still, the second end of the flexible cable boom 12 may be directly electrically coupled to the headset amplifier without the aid of a connector.

A removable open cell foam cover 22 disposed about the microphone assembly 14 reduces the amount of sound transmitted to the microphone due to undesirable extraneous noises such as wind and so-called breath pops and also protects the microphone assembly 14 from dust and other undesirable particles which would otherwise accumulate on the microphone assembly 14.

Figure 2:
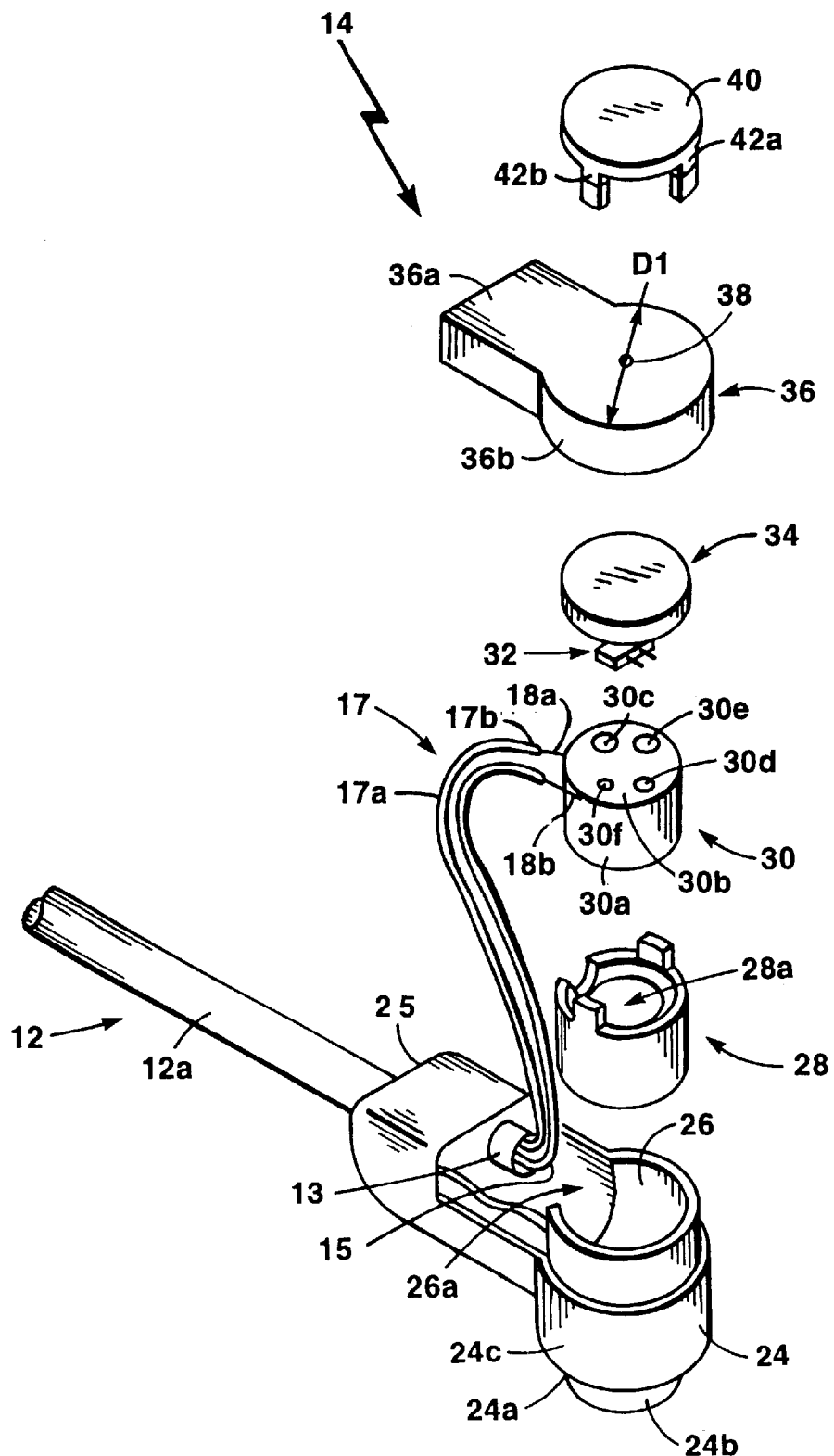
FIG. 2 is an exploded view of a microphone coupled to a first end of a flexible microphone boom.

Referring now to FIG. 2, the microphone assembly 14 of FIG. 1 is shown to include a microphone housing 24 here provided from molded plastic. The microphone housing 24 includes a base region 24a having a recess 24b disposed therein and sidewall regions 24c integrally formed and coupled to said base 24a to provide the microphone housing 24 having a cavity region 26 and a first open end 26a.

A microphone boot 28 (here shown having a portion thereof removed) provided from an "acoustically dead" rubber material such as santoprene thermoplastic rubber is disposed in the cavity 26. The microphone boot. 28 is provided having a cavity region 28a shaped to conformally accept a microphone 30 disposed in the cavity region 28a of the microphone boot 28. The microphone boot 28 also mates with a V shaped ridge in the microphone housing 24 to seal the boot 28 to the cavity and thus the microphone is sealed to the front cavity.

The microphone 30 includes a metal housing 30a having disposed thereon as shown a printed circuit board 30b having conductive traces provided thereon to allow the cable to be soldered to ground and to allow the cable's microphone signal lead to be electrically coupled to the microphone. The printed circuit board 30b also has provided thereon an outer conductive trace which is used to provide a ground connection between the printed circuit board 30b and the metal housing 30a. The printed circuit board 30b also includes conductor contact regions 30c and 30d and rear microphone ports 30e, 30f. The rear microphone ports 30e, 30f act as delay lines to cancel out of phase signals which enter the opposite side of the microphone 30, and thus provide the microphone as a directional microphone.

Figure 3:
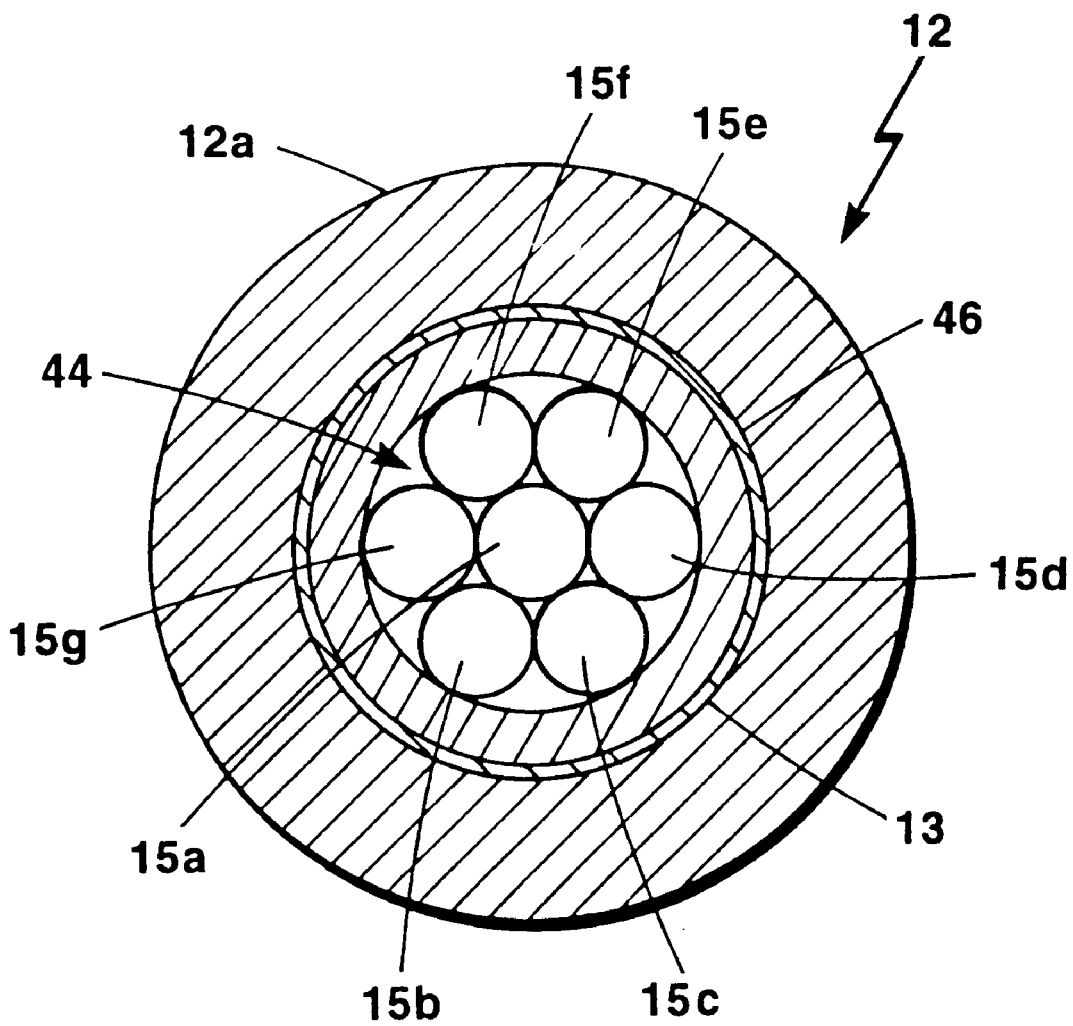
FIG. 3 is a cross-sectional view of a flexible microphone boom.

The flexible microphone boom 12 is inserted through a first end 25 of the microphone housing 24 and terminates in a portion of a cavity region 26. The flexible microphone boom 12 includes an outer jacket 12a, a portion of which is stripped back to expose a spiral wrapped shield 46 (FIG. 3). As shown in FIG. 2, the spiral wrapped shield 46 has been unwrapped to expose an insulator 13. A portion of the insulator 13 is removed to expose a plurality of wire strands generally denoted 15. Here, the strands are each provided as conductive strands, however, all of the strands need not be provided from a conductive material. One of the exposed strands 15 is conductive and electrically coupled to the microphone 30 via an insulated wire 17a. A second microphone wire 17b, which may also be provided as an insulated microphone wire, is coupled between the microphone 30 and a ground wire provided by twisting the spiral wrap shield of the flexible microphone boom 12.

The outer jacket 12a of the flexible microphone boom 12 is secured to the housing 24 to thus secure the microphone boom 12 to the housing 25. An adhesive such as Locktite 460 may be used for example to secure the jacket 12a to the housing 25. Alternatively, epoxies or other adhesives may also be used to secure the jacket 12a to the housing 24. The conductive strands 15 with insulator 13 and shield 46 are secured to the jacket 12a using an adhesive such as Locktite 460 to thus prevent the conductive strands from sliding in the jacket 12a.

In alternate embodiments, the boom 12 could be secured to the housing using a mechanical structure such as a cord-clamp, an eyelet or any other type of clamp or other mechanical structure or means well known to those of ordinary skill in the art could be used to secure the boom 12 to the housing 24.

In still another embodiment, one or more of the strands 15a–15f could be bent at angles such that the housing 24 could capture and secure the strands 15 and thus secure the boom 12 to the housing 24. The ends of the bent strands may be embedded in the housing by molding, for example, to secure the boom 12. Thus, means are used to secure the outer jacket 12a to the microphone housing 24 and the same or different means are used to secure the conductive strands 15 to the outer jacket 12a and to each other.

The flexible microphone boom 12 will be described in detail below in conjunction with FIG. 3. Suffice it here to say that the flexible microphone boom 12 allows the microphone assembly 14 to be freely positioned by the user for optimal comfort and sound transmission to the microphone. Moreover, the microphone boom 12 maintains the microphone in the position set by the user.

A diode 32 having first and second electrodes 32a, 32b is disposed on a PC board disposed on a first surface of and electrically coupled to the microphone 30. The printed circuit board was provided having two solder pads one of which is connected to the microphone case. The diode 32 which is here provided as a zener diode is coupled across the solder pads of the printed circuit board to provide static discharge protection.

A microphone damping pad 34 here provided from polyester urethane or any other similar material selected to improve the acoustic properties of the microphone housing 30a and to match the acoustic properties of the microphone housing 24 to the microphone 30 is disposed over the diode 32. The damping pad 34 is here provided from an open cell foam which is relatively transparent to a signal having a relatively low frequency characteristic and which provides a damping effect to signals having a relatively high frequency characteristic.

A cover 36, here provided from molded plastic, includes a top wall 36a having an aperture 38 centrally disposed therein and sidewalls 36b. Here, sidewalls 36b are integrally formed with the top wall 36a. The cover 36 is provided having a shape corresponding to the shape of the microphone housing 24 and is here provided having a substantially circular portion with a diameter D1 typically of about 0.406 inch (in.) selected to provide a so-called "snap fit" over the open end 26a of the microphone housing 24 to thus provide an enclosed microphone assembly 14. The aperture 38 is here provided having a diameter typically of about 0.054 in.

Support members 42a, 42b and 42c (FIG. 2) are disposed on a first surface 36a of the cover 36 about the aperture 38 and space a baffle 40, here provided having a disk shape with a diameter D3 typically of about 350 in., a predetermined distance above the first surface 36a of the cover 36. Here, for convenience, support members are shown provided as an integral portion of the baffle 40. Those of skill in the art, however, will recognize that cover 36, baffle 40 and support members 42a–42c may be integrally formed and provided as one piece via injection molding techniques, for example, or alternatively each piece may be provided separately and assembled using conventional techniques.

The microphone assembly 14 may be provided, for example, as the type described in application Ser. No. 952,956 filed Sep. 29, 1992 assigned to the assignee of the present invention and incorporated herein by reference.

Referring now to FIG. 3, in which like elements of the flexible microphone boom 12 of FIG. 2 are provided having like reference designations, the flexible microphone boom 12 is shown to include an inner conductor 44 having a diameter $D_1$ typically in the range of about of about 0.050 inches to 0.060 inches (e.g. generally about 16 AWG). The inner conductor 44 is provided from the plurality of strands 15a–15g generally denoted 15 each of which in this embodiment is provided as a conductive strand. Each of the strands 15 is provided having a diameter typically of about 0.020 inches (24 AWG). In this particular embodiment, strands 15a–15f are provided from 24 AWG type 304 stainless steel while strand 15g is provided from 24 AWG bare soft copper. The support wires 15a–15f and the microphone wire 15g are integrally wound to provide the inner conductor 44.

The copper strand 15g is coupled to the microphone 30 (FIG. 2) via a wire which is preferably more flexible than the strand 15g. A first end of the wire is soldered to the microphone and a second end of the wire is soldered to strand 15g.

Since the color of the single copper strand 15g is easily identified by color in the bundle of wire strands 15, the copper strand 15g is coupled to the microphone 30. Furthermore, it is not necessary to plate or tin the end of the copper strand 15g prior to soldering to the microphone 30. Rather, the copper strand 15g can be directly soldered to the microphone 30 without tinning or plating. Alternatively, the copper strand 15g can be coupled to the microphone 30 by via a connection wire as shown in FIG. 2. Thus, suffice it here to say that the use of the copper strand 15g facilitates connection to the microphone 30. It should be noted, however, that any of the plurality of wires 15 could serve as the microphone wire.

A first one of the stainless steel strands 15a is centrally located and each of the remaining plurality of strands 15b–15g are disposed about the centrally located strand 15a in a generally circular shaped pattern. The outer strands 15b–15g are wrapped in a slow spiral about the inner strand 15a. The spiral wrap serves to hold the outer strands 15b–15g together and also maintains the strand 15a in the central position.

The wire strands 15a–15f are provided from stainless steel since the stainless steel is relatively inexpensive, retains its shape when bent, facilitates the manufacturing process, is non-corrosive and is strong. Those of ordinary skill in the art will recognize of course that any conductive material having equivalent electrical and mechanical characteristics and which may be used to provide a low cost, strong flexible and reliable inner conductor may also be used.

It should be noted that although in this particular embodiment 6 strands of wire are used to surround the center strand it is possible to use fewer or more than 6 strands. For example, five or seven strands could be used. An even number of strands is preferred since this allows a symmetric grouping of the wires and lessens the possibility of having voids between the wire strands 15a–15f. Although an odd number of strands may be used, the use of an odd number of strands may result in the center strand having a greater tendency to move or float due to gaps which may exist between the strands. Moreover the use of an even number of strands, such as six strands, results in a cable having a generally circular cross sectional shape.

In the present embodiment the wire strands 15 are each provided having the same cross sectional diameter to thus facilitate the manufacturing of the cable. It is also possible, however, to provide the inner conductor from a plurality of wires which do not have the same cross sectional diameter.

The insulator 13 having a thickness typically of about 0.010 inches and having a durometer typically of about 80 is disposed about the inner conductor 44. The diameter of the insulator 13 is selected to provide the inner conductor 44 and insulator 13 combination via a relatively small cross-sectional diameter. The durometer of the insulator 13 was selected to provide a robust insulator. The insulator 13 may be provided from any dielectric material including thermoplastic materials such as polyvinyl chloride (PVC) or the like.

A flexible outer conductor 46 having a thickness $D_3$ typically of about 0.003 inches (40 AWG) is disposed about the first insulator 13. The thickness of the conductor 46 is here selected since it is relatively easy to dispose over the insulator 13 and it provides the cable 16 having a relatively small cross-sectional diameter. Those of ordinary skill in the art will recognize of course that conductor 46 may be provided having a lesser or greater thickness.

The outer conductor 46 provides an electrical shield about the inner conductor 44. Although the conductor 46 is here provided from a spiral wrap of strands, those of ordinary skill in the art will recognize that conductor 46 may alternatively be provided from braided tinned copper and that in practice any suitable conductive material besides copper may also be used. Moreover, the outer conductor 46 need not be braided. The conductor 46 should however, remain flexible and still provide a good electrical shield for the flexible cable boom.

The outer jacket 12a having a thickness typically of about 0.025 inches and a durometer typically of about 86 is disposed about the outer conductor 46. The jacket 12a is provided from a PVC/polyurethane blend comprised of about 30% polyurethane and about 70% PVC (Vista compound #93-607B). The jacket 12a may of course also be manufactured from other conventional materials well, known to those of ordinary skill in the art. The particular type of material from which the jacket is provided may be selected in accordance with ease of manufacturing and may also depend on the particular type of finish desirable to have on the outer surface of the outer jacket 12a.

As described herein, the flexible boom 12 withstands typically of about 2000 flexes extending between the angles of plus and minus 60 degrees over a one inch radius without loss of electrical continuity, breakage of any center conductor strands 15 or loss of mechanical consistency along the length of the cable 12.

Having described preferred embodiments of the invention it will now become apparent to one of skill in the art that other embodiments incorporating their concepts may be used. It is felt therefore that these embodiments should not be limited to disclosed embodiments but rather should be limited only by the spirit and scope of the appended claims.

What is claimed is:

1. A microphone boom comprising:
    an inner conductor including:
        a microphone wire strand in electrical communication with a microphone; and
        a plurality of wire strands;
    a first insulator concentrically disposed about said inner conductor;
    an outer conductor concentrically disposed about said first insulator; and
    an outer jacket concentrically disposed about said outer conductor,
    wherein said inner conductor imparts to said microphone boom a characteristic of being freely positionable by a user, said microphone boom maintaining a first position until moved to a further position by said user.

2. The microphone boom of claim 1 wherein:
    a first one of said plurality of wire strands is centrally located and each of said remaining plurality of strands including said microphone wire are disposed about said centrally located strand; and
    the microphone wire is disposed about said centrally located strand.

3. The microphone boom of claim 2 wherein said remaining plurality of wire strands and said microphone wire are wrapped in a spiral pattern about said centrally located strand.

4. The microphone boom of claim 3 wherein:
    said microphone strand is provided from a, first type conductive material; and
    said plurality of wire strands are provided from a second conductive material.

5. The microphone boom of claim 4 wherein said first type conductive material is copper and said second type conductive material is steel.

6. The microphone boom of claim 1 wherein said plurality of wire strands comprise:
 a first stainless steel strand; and
 five stainless steel strands disposed about said first stainless steel strand; and
 wherein said microphone wire comprises:
  a copper strand disposed about said first stainless steel strand.

7. The microphone boom of claim 6 wherein:
 said first stainless steel strand is provided having a diameter of about 0.020 inches;
 each of said five stainless steel strands are provided having diameters of about 0.020 inches; and
 said copper strand is provided having a diameter of about 0.020 inches.

8. The microphone boom of claim 6 wherein said five stainless steel strands and said microphone wire are wrapped in a spiral pattern about said first stainless steel strand.

9. A microphone boom having a first end and a second end, the first end coupled to a microphone, the second end coupled to a headset amplifier, the microphone boom comprising:
 a conductive core comprised of a plurality of strands of wire;
 a first insulator concentrically disposed about said core;
 an outer conductor concentrically disposed about said first insulator; and
 an outer jacket concentrically disposed about said outer conductor,
 wherein said conductive core maintains said microphone boom in a first position until movement to a further position by a user.

10. The Microphone boom of claim 9 wherein at least one of said plurality of strands is provided from copper.

11. A headset comprising:
 a microphone;
 a flexible microphone boom having first and second opposing ends wherein a first end of said boom is electrically coupled to said microphone, said microphone boom including an inner conductive core having of a plurality of strands, a first insulator disposed about said core, an outer conductor disposed about said first insulator for shielding said core, and an outer jacket disposed about said outer conductor; and
 a connector having a first end and a second end, said first end electrically coupled to a second end of said boom, said second end adapted to couple to a headset amplifier.

12. The headset of claim 11 wherein said flexible microphone boom further comprises:
 a microphone wire among said plurality of strands of said core.

13. The headset of claim 11 wherein said plurality of strands of said inner conductive core of said flexible microphone boom comprises:
 a first stainless steel strand;
 five stainless steel strands disposed about said first stainless steel strand; and
 a copper strand disposed about said first stainless steel strand.

14. The microphone boom of claim 13 wherein said five stainless steel strands and said copper strand are disposed about said first stainless steel strand in a spiral pattern.

15. A microphone boom comprising:
 a conductive core including a microphone wire and a plurality of wire strands, said microphone boom capable of being bent from a first shape to a second shape, said core retaining said microphone boom in said first and second shape;
 a first insulator concentrically disposed about said core;
 an outer conductor concentrically disposed about said first insulator; and
 an outer jacket concentrically disposed about said outer conductor.

* * * * *

UNITED STATES PATENT AND TRADEMARK OFFICE
CERTIFICATE OF CORRECTION

PATENT NO. : 6,411,709 B1
DATED : June 25, 2002
INVENTOR(S) : Robert E. Lucey

It is certified that error appears in the above-identified patent and that said Letters Patent is hereby corrected as shown below:

<u>Title page,</u>
Item [57], ABSTRACT,
Line 3, "Fin" should read -- an --;

<u>Column 2,</u>
Line 39, "12" should read -- 21 --;
Line 62, "boot."should read -- boot --;

<u>Column 4,</u>
Line 32, "350 in.," should read -- .350 in., --;

<u>Column 6,</u>
Line 14, "well," should read -- well --; and
Line 60, "a, first" should read -- a first --.

Signed and Sealed this

First Day of July, 2003

JAMES E. ROGAN
*Director of the United States Patent and Trademark Office*